(12) United States Patent
Wang et al.

(10) Patent No.: US 8,184,362 B2
(45) Date of Patent: May 22, 2012

(54) PHASE CONTROL AND LOCKING METHOD FOR COHERENTLY COMBINING HIGH-GAIN MULTI-STAGE FIBER AMPLIFIERS

(75) Inventors: Shuoqin Wang, Westlake Village, CA (US); Metin Mangir, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 12/484,757

(22) Filed: Jun. 15, 2009

(65) Prior Publication Data

US 2010/0315699 A1    Dec. 16, 2010

(51) Int. Cl.
*H01S 3/00* (2006.01)
(52) U.S. Cl. .............................. 359/349; 372/6; 385/39
(58) Field of Classification Search .................. 359/349; 385/39; 372/6
See application file for complete search history.

(56) References Cited

U.S. PATENT DOCUMENTS

| 5,233,673 | A | | 8/1993 | Vali et al. | |
|---|---|---|---|---|---|
| 6,061,170 | A | * | 5/2000 | Rice et al. | 359/345 |
| 6,233,085 | B1 | | 5/2001 | Johnson | |
| 6,400,871 | B1 | | 6/2002 | Minden | |
| 7,339,727 | B1 | * | 3/2008 | Rothenberg et al. | 359/349 |
| 2004/0145801 | A1 | * | 7/2004 | Rice et al. | 359/349 |
| 2008/0304139 | A1 | * | 12/2008 | Suzuki et al. | 359/349 |
| 2011/0032602 | A1 | * | 2/2011 | Rothenberg | 359/341.1 |

OTHER PUBLICATIONS

Hans Bruesselbach, Shuoqin Wang, Monica Minden, D. Cris Jones, and Metin Mangir, "Power-scalable phase-compensating fiber-array transceiver for laser communications through the atmosphere", J. Opt. Soc. Am. B, vol. 22, pp. 347-353, 2005, Opt. Soc. Am., Washington, D.C.

* cited by examiner

*Primary Examiner* — Mark Hellner
(74) *Attorney, Agent, or Firm* — Kevin G. Fields (57) ABSTRACT

Presented is a method and system for phase locking a multi-stage parallel fiber amplifier. The method comprises receiving a signal beam from a first stage, in one path of the multi-stage fiber amplifier, onto a fiber that is pumped to produce a saturated signal beam that is then output to a second stage that outputs an amplified beam. A characteristic of the of the saturated signal beam is that its phase and amplitude do not substantially change based on the amplitude of the signal beam input onto the fiber. The method further detects a portion of the amplified beam to produce a phase indication of the amplified beam relative to amplified beams of the other paths of the multi-stage fiber amplifier. The method modulates the pump level of the first stage to control the phase of amplified beam, and further controls the phases of the other amplified beams of the other paths to phase lock the multi-stage parallel amplifier. The saturated signal beam reduces phase changes in the second stage that would be opposite to, and therefore counteract, the phase changes intentionally modulated in the first stage.

20 Claims, 8 Drawing Sheets

PHASE CONTROL AND LOCKING METHOD FOR COHERENTLY COMBINING HIGH-GAIN MULTI-STAGE FIBER AMPLIFIERS

FIELD

Embodiments of the subject matter described herein relate generally to a method for combining fiber amplifiers in multiple stages to make a high power fiber amplifier.

BACKGROUND

Single-stage fiber amplifiers are limited in their ability to amplify a source signal. To further amplify a source signal, the outputs of multiple fiber amplifiers can be joined together to produce a higher power output signal. To achieve high amplification powers, the amplifiers are further arranged into multiple stages, with the output of a first stage fiber amplifier being the input to a higher power second stage fiber amplifier. Phase locking the fiber amplifiers prevents a loss in power output due to destructive interference between the various output signals.

One method of phase locking the multiple fiber amplifiers is described in U.S. Pat. No. 6,400,871 to Minden. Minden describes a method of coherently phase combining multiple fiber amplifiers by modulating the pump current of the multiple fiber amplifiers. Modulating the pump current of a fiber amplifier changes the gain of the fiber amplifier and induces a change in the phase of the output. A detector receives a portion of the output from each fiber amplifier and detects the change which is then used in a feedback loop to adjust the phases of each of the fiber amplifiers in order to phase lock the fiber amplifiers together.

The method described by Minden works so long as there is a detectable change that correlates to a corresponding change in phase. To achieve high power outputs, multiple stage fiber amplifiers are used. However, when the gain of the first stage is modulated in order to induce a change in phase, the modulating of the gain also modulates the output power that is being input into the second stage. The modulation in the output power changes the gain of the second stage, which causes an opposite change in phase in the second stage fiber amplifier. At high powers, the change in phase induced by modulating the pump current in the first stage is cancelled by the opposite change in phase induced by the changes to the gain of the second stage.

Also, particularly at high power amplification levels, system noise can cause amplified spontaneous emission (ASE), or unwanted lasing to spontaneously occur, especially when the source signal is a pulsed source signal.

SUMMARY

Presented is a method for coherently phase combining multiple fiber amplifiers in a multi-stage configuration to amplify a source signal to a higher power level than previously possible using either single-stage fiber amplifiers or multiple coherently phase combined fiber amplifiers, while reducing the occurrence of amplified spontaneous emission (ASE.) In various embodiments, the system and method improves output power characteristics of the amplifiers through the use of a saturated amplifier stage.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method of phase-controlled high-gain multi-stage amplification. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Fiber amplifiers are limited in their ability to amplify a source signal. Typically, a fiber amplifier can amplify an input signal by approximately 20 db. To further amplify a source signal, multiple fiber amplifiers are joined together and synchronized to produce a higher power output signal. U.S. Pat. No. 6,400,871 to Minden describes a method of coherently phase combining multiple fiber amplifiers to produce a higher power output signal.

Figure 1A:
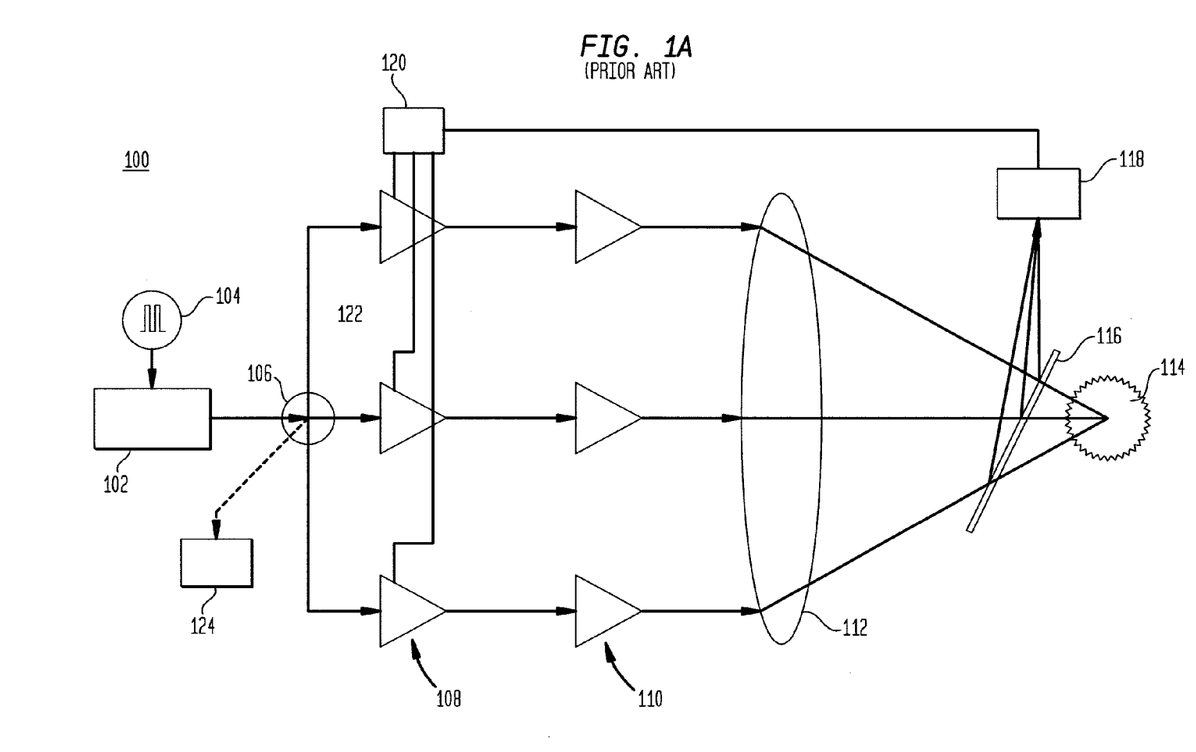
FIG. 1A is a functional diagram of a prior art fiber amplification system.

Referring now to FIG. 1A, a phase coherent multiple fiber amplifier 100 comprises a laser source 102, a pulse signal generator 104, a fiberoptic splitter 106, a plurality of fiber optic fibers 122, a plurality of fiberoptic pre-amplifiers 108, a plurality of power amplifiers 110, a collimator 112, a beam splitter 116, a detector 118, a phase controller 120, and a monitoring port 124. The phase coherent multiple fiber amplifier 100 produces a focused spot of illumination 114.

The pulse signal from the pulse signal generator 104 is applied to the laser source 102 to produce a low-power coherent beam of pulsed light or electromagnetic radiation. In an embodiment, the laser source 102 is a fiberoptic amplifier. In other embodiments, the laser source 102 is a solid state or gas laser, for example a diode laser, a Nd:YAG laser, a Nd:YVO$_4$ laser, or Nd:GdVO$_4$ laser. In an embodiment, the laser source 102 is a 1064 nm laser. In an embodiment, the laser source 102 is a 940 nm to 1600 nm laser. In an embodiment, the pulse signal from the pulse signal generator 104 comprises 2-5 ns pulses at a frequency of between 10 khz to 1 Mhz. In the embodiment shown in FIG. 1A, the low power pulsed light is split by fiberoptic splitter 106 into three fibers 122 corresponding to the three pre-amplifiers 108, and three power amplifiers 110. In an embodiment, each of the fibers 122 is an Nd-doped single mode fiber. The fibers 122 connect the fiberoptic splitter 106 to the pre-amplifiers 108. In embodiments, there can be any number of fibers 122, pre-amplifiers 108, and power amplifiers 110, however in practice the phase coherent multiple fiber amplifier 100 typically uses ten or fewer fibers 122, pre-amplifiers 108, and power amplifiers 110. In embodiments, the pre-amplifiers 108 utilize laser diodes, and the power amplifiers 110 are Watt-level Er—Yb co-doped fiber amplifiers or Yb-doped fiber amplifiers. Each of the fibers 122, pre-amplifiers 108, and power amplifiers 110 defines a path through which the light is amplified.

In each path, the pre-amplifiers 108 increase the power of the low power pulse light. The pump inputs of the pre-amplifiers 108 are in communication with the detector 118 and phase controller 120 in a feedback loop to adjust the pump currents of the pre-amplifiers 108. In embodiments, the communication between the detector 118 and phase controller 120 is an electrical signal, or an other communication signal. In operation, changes in the pumping level of the pre-amplifiers 108 changes the phase of signal input into the power amplifiers 110 and is detectable by the detector 118. Therefore, varying the pumping levels in the pre-amplifiers 108 is used to phase control the power amplifiers 110.

In the embodiment of FIG. 1A, the outputs of the pre-amplifiers 108 are applied to the power amplifiers 110. The outputs of the power amplifiers 112 are optically collimated by collimator 112 that recombines the outputs to produce a focused spot of illumination 114. In embodiments, the focused spot of illumination 114 is focused in the far field, for example at a distance of meters to thousands of meters from the phase coherent multiple fiber amplifier 100. In one embodiment, the detector 118 is also in the far field. In one embodiment, the detector 118 detects illumination returned from the focused spot of illumination 114 in the far field. In one embodiment, a portion of the output is directed to the detector 118 by means of a beam splitter 116. In embodiments, the beam splitter 116 is a semi-silvered mirror, a birefringent crystal, a holographic element, or any other known beam splitting means as would be commonly understood by one of skill in the art.

The output of the detector 118 is input to the phase controller 120 which varies the power fed to the pumps of each of the plurality of preamplifiers 108 to phase lock the phase coherent multiple fiber amplifier 100. In one embodiment, the phase controller 120 phase locks the outputs of each of the power amplifiers 110 to the same phase. In one embodiment, the phase controller 120 phase locks the outputs of each of the power amplifiers 110 to the slightly different phases, for example to perform beam steering. In one embodiment the detector 118 comprises a photodiode. In one embodiment, the detector 118 is an array of sensors, for example a CCD or array of photodiodes. In one embodiment, the detection is performed at a monitoring port 124, for example using returned or backscattered radiation from one or more of the amplifier stages 108, 110.

Power amplifiers 110 that are out of phase create beams that interfere destructively, thereby reducing power levels at the focused spot of illumination 114. The power amplifiers 110 are phase locked to prevent destructive interference, resulting in more power at the focused spot of illumination 114. Varying the pumping levels in the pre-amplifiers 108 produces a detectable change in the optical phase response of the beam created by the phase coherent multiple fiber amplifier 100. The detectable change is detected by the detector 118, transmitted to the phase controller 120, and used as feedback to modify the pumping of the pre-amplifiers 108. Without feedback, the output of the phase coherent multiple fiber amplifier 100 would vary from maximum to minimum due to ubiquitous phase perturbations such as from air perturbations, temperature variations, fiber vibrations, the wavelength drift of pump currents, and other sources. Ubiquitous phase perturbations are generally relatively slow changes and tend to occur between 10 ms and a few hundred milliseconds, allowing the detector 118 and phase controller 120 to gradually adjust the pumping of the pre-amplifiers 108 to negate the perturbations.

Although suitable for watt level applications, there is a limit to the amount of amplification in the pre-amplifiers 108. For example, as the power output from the preamplifier 108 is increased from 0.1 Watt to 10 Watts, problems controlling the phase of the beams of the phase coherent multiple fiber amplifier 100 occurs because changes in the gain not only affects the phase shift in the pre-amplifier 108, but also affects the gain and therefore the phase shift in the next stage, the power amplifier 110. Also, as amplification is increased, system noise increasingly causes spontaneous lasing in the power amplifier 110 stage.

Figure 1B:
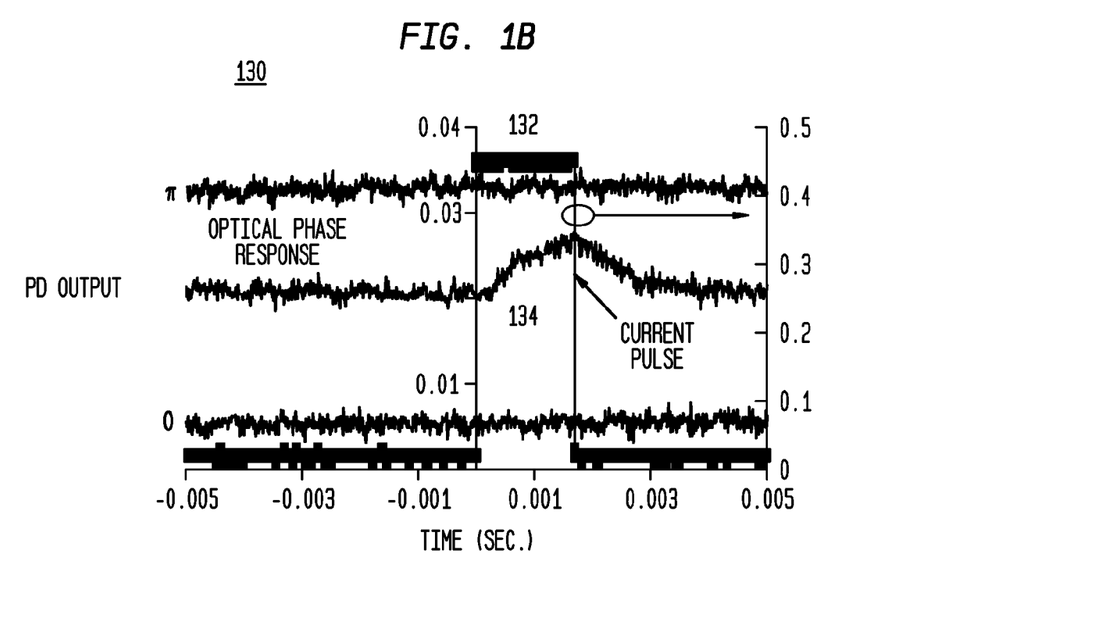
FIG. 1B is a graph of the optical phase response of a fiber amplification system at a low amplification level.
Figure 1C:
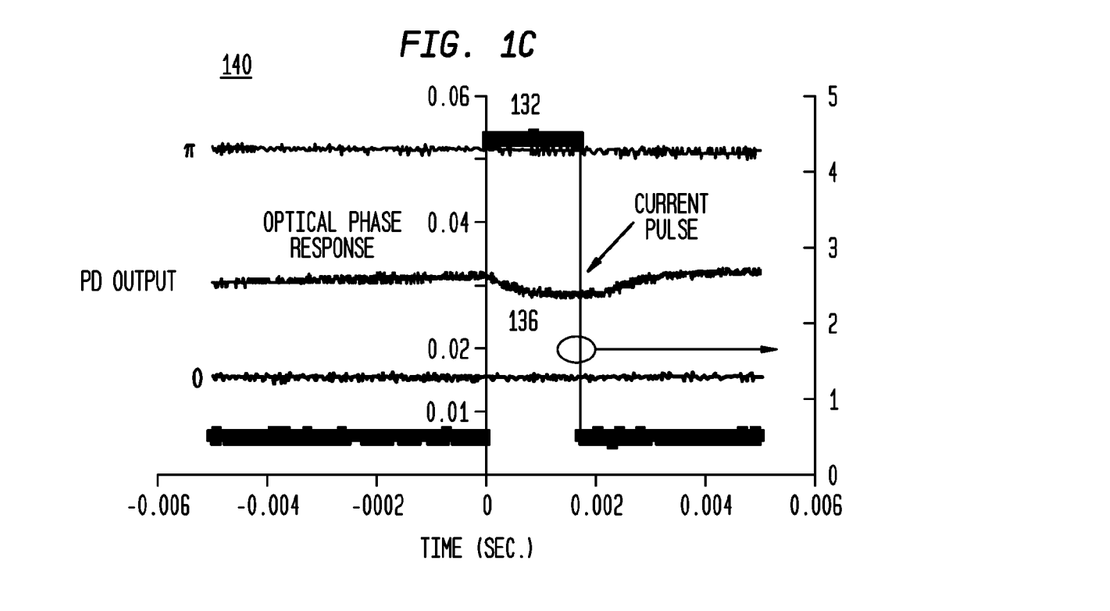
FIG. 1C is a graph of the optical phase response of a fiber amplification system at a high amplification level.

As the pump current from the pre-amplifier 108 is increased, it produces a change in phase and power level input to the power amplifier 110. However, the additional power received by the power amplifier 110 produces an opposite phase change in the power amplifier 110, cancelling to a large degree the phase change achieved by the pre-amplifier 108. Referring now to FIGS. 1B and 1C, graphs of phase changes 134, 136 are illustrated for the phase coherent multiple fiber amplifier 100 at 100 mW levels 130 in FIG. 1B, and the phase coherent multiple fiber amplifier 100 at 5 Watt levels 140 in FIG. 1C. The experimental results of using current pulses 132 applied to the pumps of the pre-amplifiers 108 to phase control the phase coherent multiple fiber amplifier 100 shows that for the 100 mW level 130, there is an identifiable change in phase change 134. However, at the 5 Watt level 140, the higher power input into the power amplifier 110 from the preamplifier 108 changes the gain of the power amplifier 110 and creates a phase change that cancels the phase change of the pre-amplifier 108. This results in only an overall slight phase change 134 that is output from the phase coherent multiple fiber amplifier 100. Therefore, at the 5 Watt amplification level, pumping the pre-amplifier 108 does not produce a phase change 134 that the detector 118 could consistently and accurately use to phase lock the phase coherent multiple fiber amplifier 100.

Figure 1D:
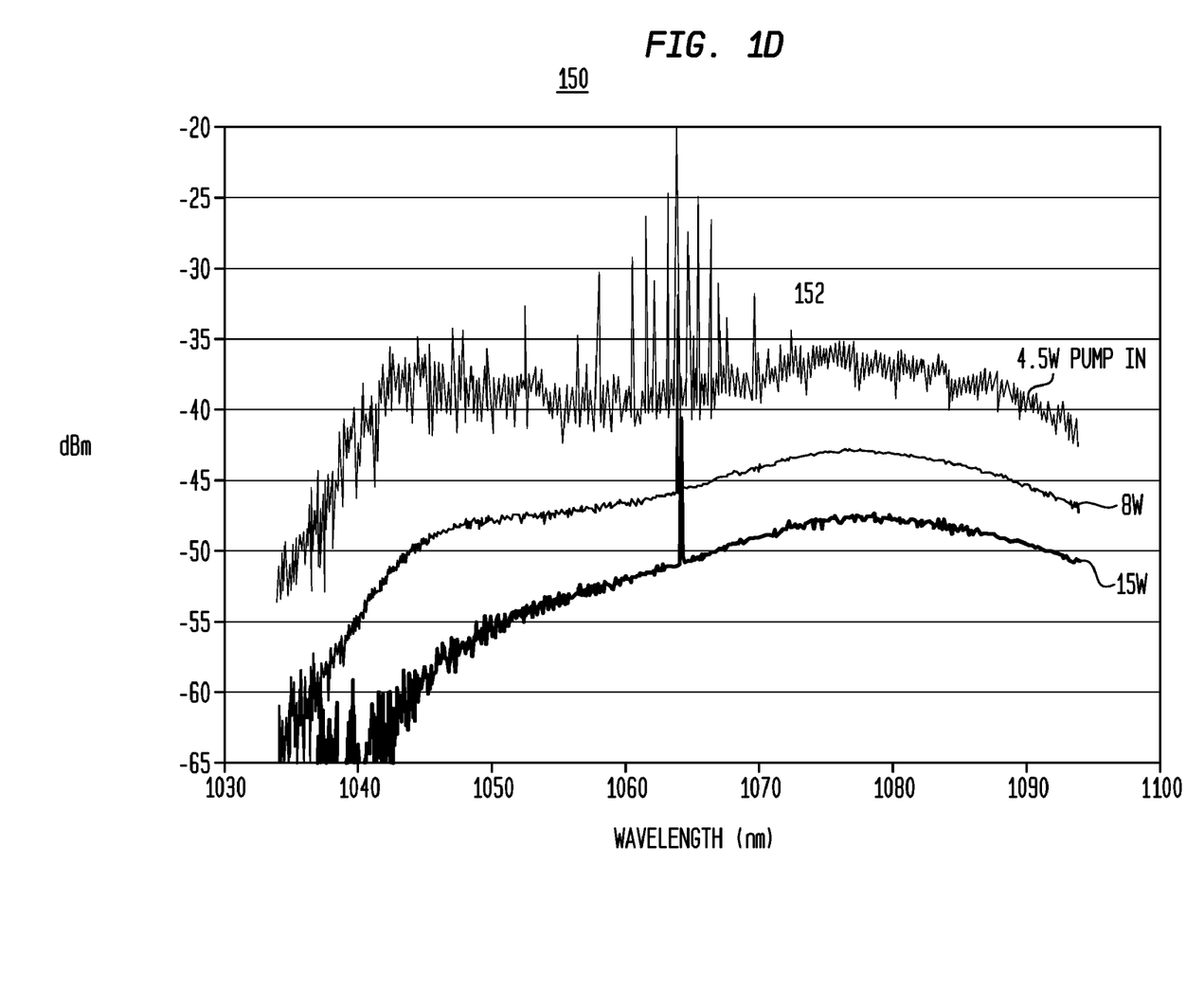
FIG. 1D is a graph of amplified spontaneous emission (ASE) backscattered from a fiber amplification system at various amplification levels.

Also, as the gain of the preamplifier 108 is increased, noise is also amplified. This amplified noise received by the power amplifier 110 causes the phase coherent multiple fiber amplifier 100 to become less stable. Referring now to FIG. 1D, a spectral graph of backscattered radiation 150 received from the phase coherent multiple fiber amplifier 100 at the monitoring port 124 and analyzed by a spectrometer is presented. The increased power from the preamplifier 108 received by the power amplifier 110 makes a phase coherent multiple fiber amplifier 100 more prone to amplified spontaneous emission (ASE) 152, especially at higher power levels.

Although suitable for watt level applications, pre-amplifiers 108 are limited in the overall amount of gain to around 20 db and in most cases less than 40 db. To achieve higher gains, for example 40 db to create fiber amplifiers that produce hundred Watt levels or more, multiple stages are required. An intermediate amplifier can be added between the pre-amplifier 108 and power amplifier 110. Although this increases the possible gain, merely adding an intermediate amplifier between the pre-amplifier 108 and power amplifier 110 only increases the unwanted gain and phase interactions.

Figure 2:
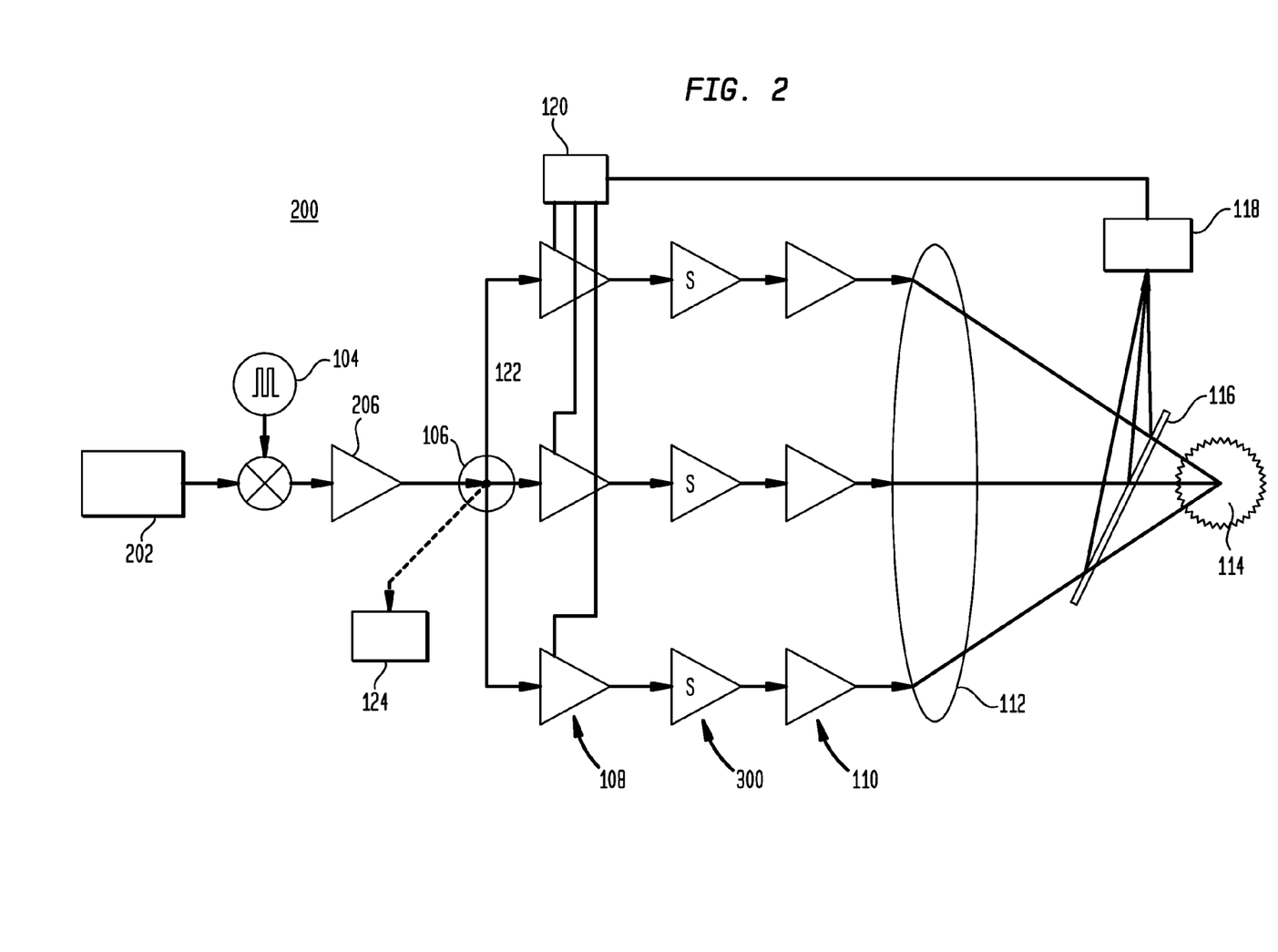
FIG. 2 is a functional diagram of a multiple-stage fiber amplifier incorporating a saturation amplifier and an optical modulator in one embodiment of the phase-controlled high-gain multi-stage amplification system and method.
Figure 3A:
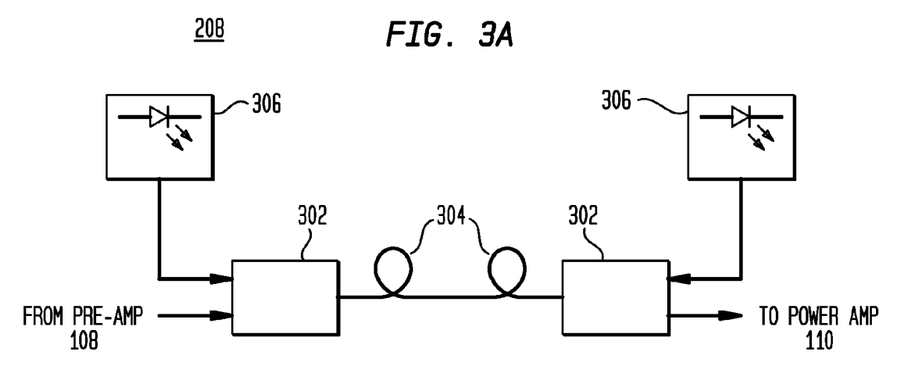
FIG. 3A is a schematic diagram of a saturation amplifier in one embodiment of the phase-controlled high-gain multi-stage amplification system and method.
Figure 3B:
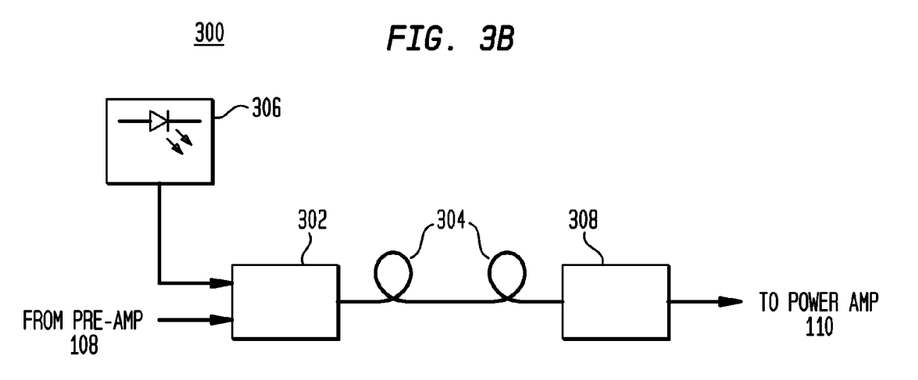
FIG. 3B is a schematic diagram of an alternate embodiment of a saturation amplifier in one embodiment of the phase-controlled high-gain multi-stage amplification system and method.
Figure 4:
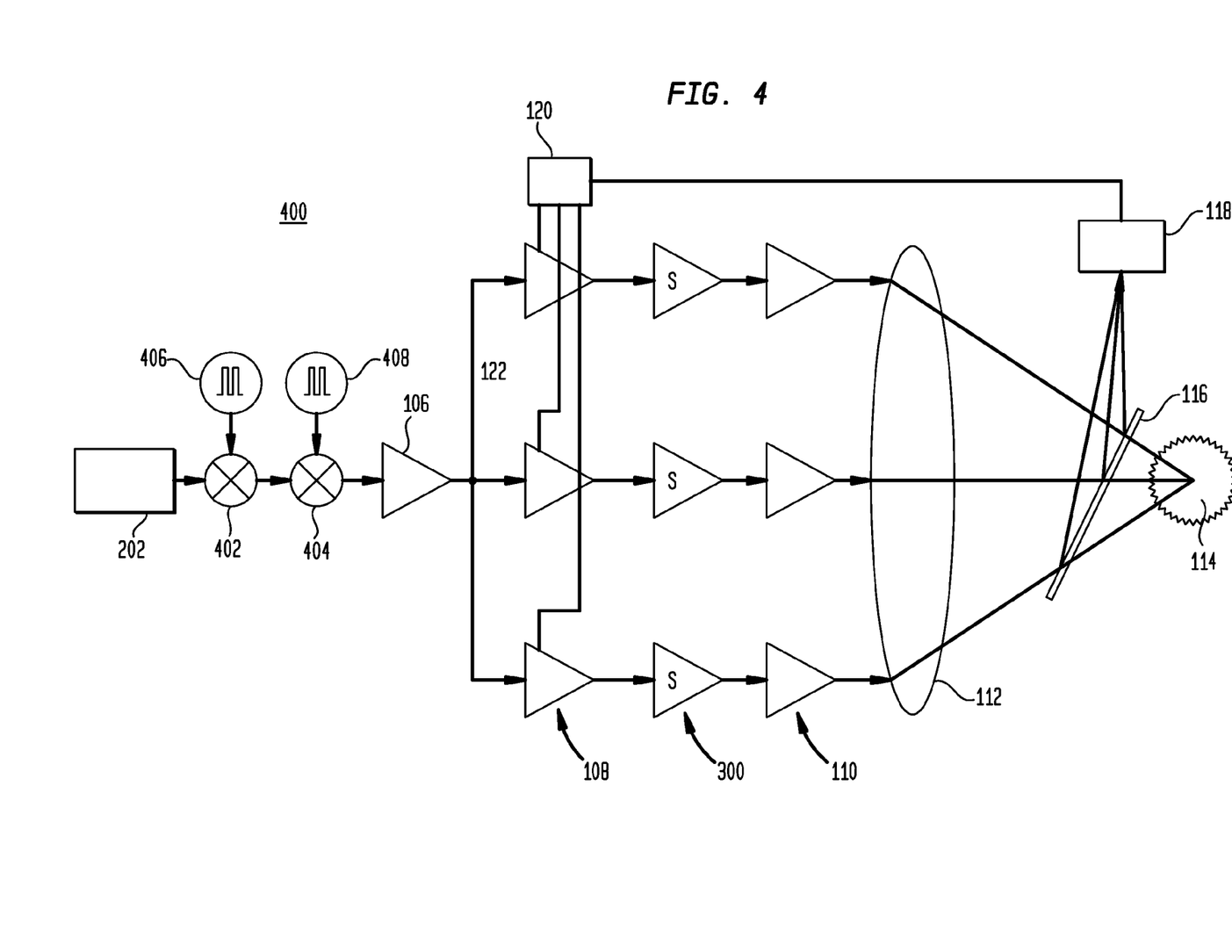
FIG. 4 is functional diagram of a multiple-stage fiber amplifier utilizing a plurality of optical modulators in one embodiment of the phase-controlled high-gain multi-stage amplification system and method.

To increase the amount of overall system gain, and to isolate the effects of the difference in phase change by the preamplifier 108 and power amplifier 110 and to stabilize the power input to the power amplifier 110, a saturation amplifier, shown as 300 in FIGS. 2, 3B and 4, and as 208 in FIG. 3A, is utilized. Referring now to FIGS. 2, 3A, 3B, and 4, a saturation amplifier 208 is used as an intermediate amplification stage between the preamplifier 108 and power amplifier 110 in each fiberoptic amplifier path.

Referring now to FIG. 2, a multi-stage fiber amplifier 200 comprises a continuous wave laser source 102, a pulse signal generator 104, an electro-optic modulator 204, a regenerator amplifier 206, a fiberoptic splitter 106, a plurality of fiber optic fibers 122, a plurality of fiberoptic pre-amplifiers 108, a plurality of saturation amplifiers 300 and isolators 210, a plurality of power amplifiers 110, a collimator 112, a beam splitter 116, a detector 118, a phase controller 120, and a monitoring port 124. The multi-stage fiber amplifier 200 produces a focused spot of illumination 114. The operation of the multi-stage fiber amplifier 200 in FIG. 2 is similar to the phase coherent multiple fiber amplifier 100 of FIG. 1, with differences described below.

In one embodiment, the signal beam fed into the pre-amplifier 108 stage is created using a continuous wave source 202 that is modulated using an electro-optical modulator 204. In one embodiment, the continuous wave source 202 is a solid state laser, such as a 10 mW Lightwave 122 laser diode operating at 1064 nm. In embodiments, the continuous wave source 202 produces a single frequency, single mode beam at a power of one to several milliwatts. In other embodiments, the continuous wave source 202 is a gas or other laser. In one embodiment, the electro-optical modulator 204 is a lithium niobate crystal, for example an electro-optic intensity modulator from Alenia Marconi Systems. In embodiments, the electro-optical modulator interrupts or modulates the intensity of the beam from the continuous wave source 202.

The triggering of the electro-optical modulator 204 is controlled by the pulse signal generator 104, for example a pulse generator from Avtech Electrosystems Ltd. In an embodiment the pulse signal from the pulse signal generator 104 is a 1 to approximately 10 ns pulse repeating at a frequency of between approximately 10 khz to approximately 1 Mhz. In another embodiment the pulse signal is application dependent, and therefore is pulsed appropriate for the application. In non-limiting examples of applications, the pulses are encoded for communications with a distant receiver or transceiver; the pulses are modulated at a power and frequency that can be easily received by a sensor, such as the detector 118, and filtered to retrieve information about the returned signal; the pulses are pulsed and/or encoded to identify a target illuminated by the focused spot of illumination 114; the pulses are modulated into a beat frequency to disrupt or alter a signal perceived by a remote sensor; the pulses are modulated to effect a specific frequency or power to disrupt or injure the retinal function of a target subject.

Continuing to refer to FIG. 2, the electro-optical modulator 204 reduces the power level of the signal beam by several db. A regenerator amplifier 206 amplifies the modulated signal beam, boosting or regenerating the modulated signal beam before it is split by the fiberoptic splitter 106 and routed to the pre-amplifiers 108 in each path using fibers 122. In an embodiment where the signal beam from the continuous wave source is not modulated, the electro-optical modulator 204 and regenerator 206 are not required.

Referring now to FIG. 4, in an embodiment a first electro-optical modulator 402 and a second electro-optical modulator 404 modulate the signal beam. In further embodiments, multiple similar and/or different modulators are utilized to produce narrow pulses or shaped pulses.

Referring again to FIG. 2, an isolator 210 such as a IO-F-1064 from OFR reduces the amount of electromagnetic radiation that escapes from the power amplifier 110 and returns to the pre-amplifier 108. Light or electromagnetic radiation from the power amplifier 110 that returns to the pre-amplifier 108 can damage or cause the pre-amplifier 108 to function incorrectly.

Continuing to refer to FIGS. 2 and 4, in embodiments, the saturation level of intermediate saturation amplifier 300 is adjusted to meet desired criteria for stable operation of the multi-stage fiber amplifier 200. In one embodiment, the intermediate saturation amplifier 300 has an output power sufficient to saturate the power amplifier 110. In one embodiment, the intermediate saturation amplifier 300 has an input characteristic such that small changes to the input power from the preamplifier 108 do not substantially alter the output power of the intermediate saturation amplifier 300. In one embodiment, the intermediate saturation amplifier 300 does not substantially alter the phase of the beam input from the preamplifier 108. In one embodiment, the intermediate saturation amplifier 300 has a phase modulation characteristic that is essentially invariant with respect to the power level input from the signal from the preamplifier 108. In one embodiment, when being pulsed the intermediate saturation amplifier 300 has an output power that is less than the self-phase-modulating threshold, and therefore does not induce or trigger the self-phase-modulating effect.

Referring now to FIG. 3A, a schematic diagram of an exemplary saturation amplifier 208 is presented. In one embodiment, the exemplary saturation amplifier 208 comprises a wave division multiplexor 302 that is connected to another wave division multiplexor 302 through a meter long Nd doped single mode fiber 304. In embodiments, the fiber 304 is any suitable length and is submeter or multiple meters in length. The fiber 304 is pumped at both ends through the wave division multiplexors 302 by pump diodes 306. The pumping process of the saturation amplifier 208 amplifies the modulated signal beam from the pre-amplifier 108 to produce a saturated signal beam if any portion of the modulated signal beam from the pre-amplifier is at or above a specific threshold. In an embodiment, the saturation amplifier 208 amplifies the modulated signal beam to the level necessary for stable operation of the multi-stage fiber amplifier 200.

The pump diodes 306 are connected to the wave division multiplexors 302 through pigtailed single mode fibers 308. In one embodiment, the signal beam from the pre-amplifier 108 is a 1064 nm signal beam, and the pump diodes 306 emit electromagnetic radiation at 818 nm. In embodiments, the fiber 304 is a Yb doped fiber, a Er doped fiber, an Er—Yb doped fiber, or other fiber as would be understood in the art. In embodiments, the wave division multiplexors 302 are for example Gould Electronics Inc. wave division multiplexors. In embodiments, the pump diode 306 is pump diode between 700 nm and 1500 nm, for example a 915 nm, 976 nm or other wavelength pump diode, a JDSU pump diode, or other pump sources as would be understood in the art. In embodiments, the fiber 304 is an LMA fiber, for example an LMA fiber having a 10000 nm or greater core, or physical core diameter, a 20000 nm core LMA fiber, or other fiber as would be understood in the art.

As shown in FIG. 3B, a saturation amplifier 300 comprises only one wave division multiplexor 302 and one pump diode 306. In the embodiment, fiber 304 is connected to a fiber coupler 308, for example an unpumped wave division multiplexor. In another embodiment knot shown), fiber 304 connects directly to the power amplifier 110 without the coupler 308.

In an embodiment, the choice of fiber 304, pump diode 306 wavelength, power of the pumped diode 304, and choice of wave division multiplexor 302, are selected to adjust the output power and characteristics of the saturation amplifier 300. In one embodiment, the selection results in a saturation amplifier 300 that has an output power sufficient to saturate the power amplifier 110. In one embodiment, the selection results in a saturation amplifier 300 that has an input characteristic such that small changes to the power from the pre-amplifier 108 does not substantially alter the output power of the saturation amplifier 300. In one embodiment, the selection results in a saturation amplifier 300 that has an output power that is less than the self-phase-modulating threshold when amplifying a pulsed signal beam. In one embodiment, the selection results in a saturation amplifier 300 that has an output power that does not substantially alter the phase of the signal beam. In one embodiment, the selection results in a saturation amplifier 300 that has an output with a phase shift, but that phase shift is substantially invariant over a range of signal beams. By invariant, it is meant that any minor dynamic changes in phase of the saturation amplifier do not produce an opposite change in phase that would cancel, or substantially interfere with, the intentional phase change induced in the pre-amplifier 108, such that a phase change will normally be detectable by the detector 118.

Changes to the phase of the signal beam are proportional to changes in the refractive index of the fiber. The equation that relates the change of the refractive index to the change of the population of the upper states of the doped ions inside the pumped fiber is:

$$\Delta n(v) = 2\pi F^2 \Delta p(v) \Delta N / n_0 \quad [1]$$

Where $\Delta n(v)$ is the change of the refractive index; F is the Lorentz factor; $\Delta p(v)$ is the difference of the ion polarizabilities in the excited and the ground states; $\Delta N$ is the difference of the population of the upper states of the doped ions inside the pumped fiber; and no is the refractive index of the fiber 304 without pumping. [1] Antipov et al., J. Opt. Soc. Am. B, Vol. 16, No. 7, 1073, 1999.

Figure 5A:
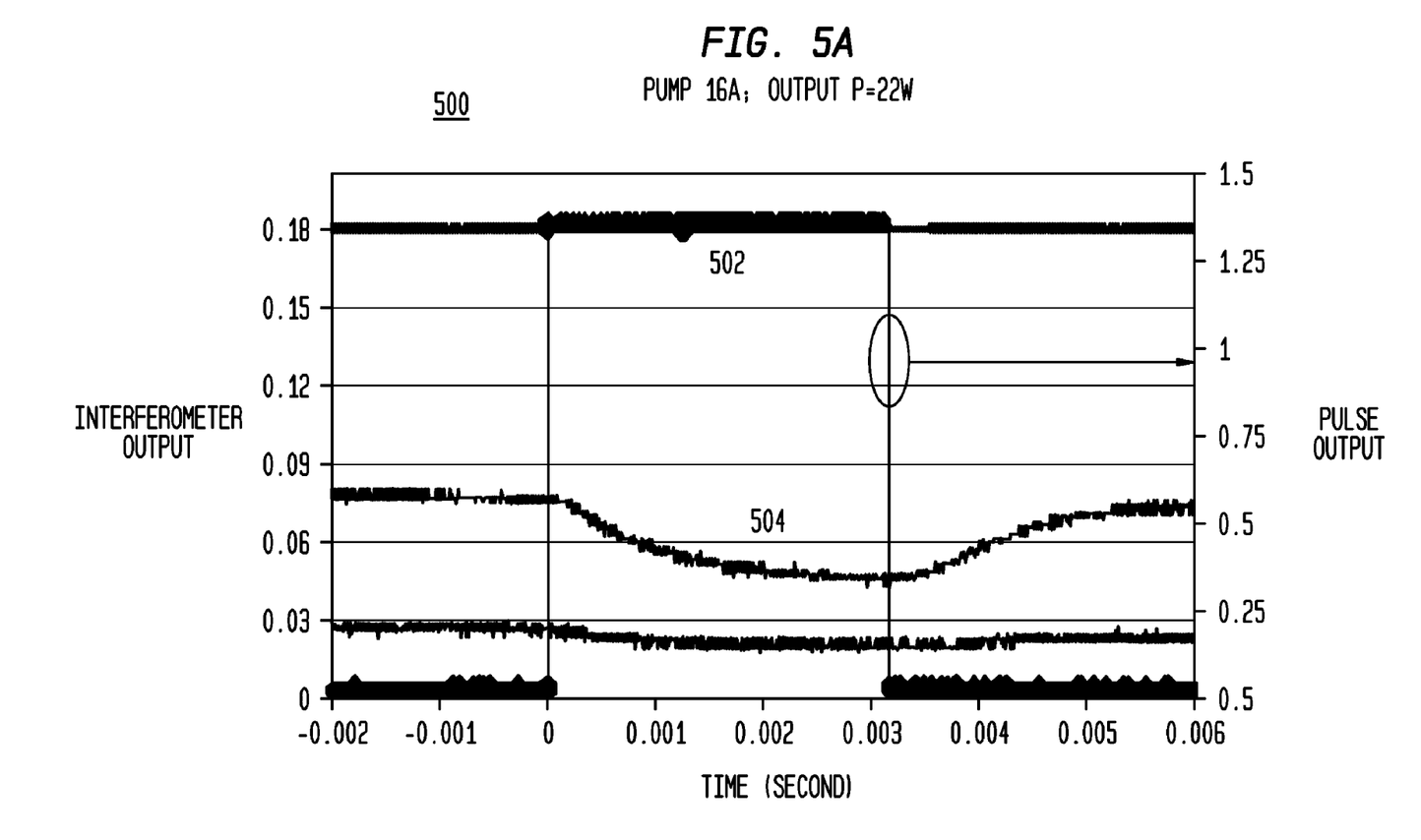
FIG. 5A is a graph of the optical phase response of the multiple-stage fiber amplifier at high amplification levels in one embodiment of the phase-controlled high-gain multi-stage amplification system and method.
Figure 5B:
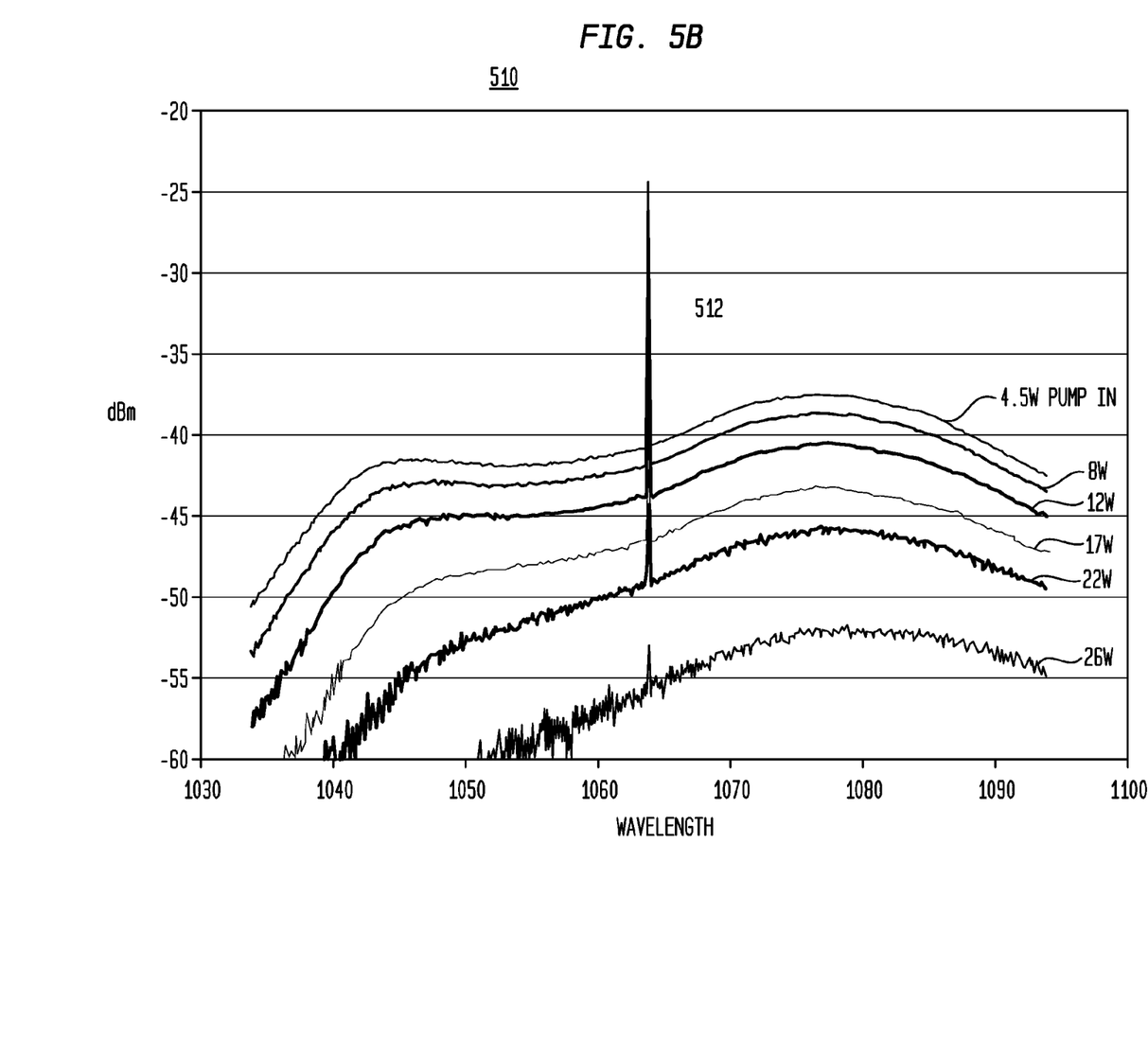
FIG. 5B is a graph showing reduced amplified spontaneous emission (ASE) backscattered from the multiple-stage fiber amplifier at high amplification levels in one embodiment of the phase-controlled high-gain multi-stage amplification system and method.

Referring now to FIG. 5A, a graph of power output is illustrated for the multi-stage fiber amplifier 200 at 22 W levels 500. The experimental results of forcing 16 Amp current pulses 502 into the pumps of the pre-amplifiers 108 of the multi-stage fiber amplifier 200 shows that for the 22 W level 500, there is an identifiable phase change 504 of approximately π/5 sufficient to use as feedback to phase lock the multi-stage fiber amplifier 200. Referring now to FIG. 5B, a spectral graph of backscatter 510 from the multi-stage fiber amplifier 200 and picked up by the interferometer 224 is presented. When compared to FIG. 1D, FIG. 5B illustrates that the stable power output from the intermediate saturation amplifier 208 into the power amplifier 110 reduces system instability and makes the multi-stage fiber amplifier 200 less prone to amplified spontaneous emission (ASE) 512, even at high power levels.

Although for purposes of illustration and simplicity of explanation the preceding figures and description describe a two stage fiber amplifier, the system and methods described herein are equally applicable to fiber amplifiers having two, three, or multiple stages. No limitation to a fiber amplifier is implied or intended.

The embodiments of the invention shown in the drawings and described above are exemplary of numerous embodiments that may be made within the scope of the appended claims. It is contemplated that numerous other configurations of the multi-stage fiber amplifier may be created taking advantage of the disclosed approach. It is the applicant's intention that the scope of the patent issuing herefrom will be limited only by the scope of the appended claims.

What is claimed is:

1. A method of phase locking a multi-stage parallel fiber amplifier, comprising:
   receiving a signal beam of a first wavelength from a first stage of an amplifier path onto a fiber;
   pumping said fiber using a second wavelength to produce a saturated signal beam having a phase and amplitude that do not substantially change based on an amplitude of said signal beam;
   outputting said saturated signal beam to a second stage of said amplifier path to produce an amplified beam;
   detecting at least a portion of said amplified beam from said second stage to produce a phase indication of said amplified beam relative to a plurality of phases of a plurality of amplified beams of a plurality of amplifier paths;
   modulating a pump level of said first stage based at least in part upon said phase indication to control a phase of said amplified beam; and
   controlling said plurality of phases of said plurality of amplified beams of said plurality of amplifier paths to phase lock the multi-stage parallel fiber amplifier.

2. The method of claim 1, wherein said signal beam is modulated and said pumping produces a saturated signal beam that suppresses amplified spontaneous emission by the second stage.

3. The method of claim 1, wherein said signal beam is modulated and said pumping produces a saturated signal beam that is below the lasing level of the second stage when the signal beam is modulated to a reduced level, and otherwise produces a saturated signal beam that is substantially constant over a range of amplified power levels of said signal beam from said first stage.

4. The method of claim 1, wherein said first stage is a pre-amplifier stage comprising a plurality of pre-amplifiers, wherein said second stage is a power amplifier stage comprising a plurality of power amplifiers, and wherein said pumping is performed by a wave division multiplexor and a pumping source.

5. The method of claim 1, wherein said first wavelength is between approximately 940 nm and approximately 1600 nm and said second wavelength is between approximately 700 nm and approximately 1500 nm.

6. The method of claim 1, wherein said fiber is selected from the group consisting of an Nd doped fiber, a Yb doped fiber, an Er doped fiber, an Er—Yb doped fiber, an LMA fiber having a physical core diameter between 10000 nm and 20000 nm, and an LMA fiber having a physical core diameter larger than 10000 nm.

7. A saturation amplifier for a multi-stage parallel fiber amplifier system, comprising:
   a first pump diode adapted to output a first electromagnetic radiation at a first wavelength;
   a second pump diode adapted to output a second electromagnetic radiation at a second wavelength;
   a fiberoptic fiber having a first end and a second end;
   a first wave division multiplexor connected to said first end of said fiberoptic fiber, adapted to receive a signal beam and said first electromagnetic radiation and couple said signal beam and said first electromagnetic radiation onto said fiberoptic fiber; and
   a second wave division multiplexor connected to said second end of said fiberoptic fiber, adapted to receive said second electromagnetic radiation and couple said second electromagnetic radiation onto said fiberoptic fiber, and adapted to output a saturated signal beam, and
   wherein said first electromagnetic radiation, said second electromagnetic radiation, and said fiberoptic fiber pump said signal beam to produce said saturated signal beam, said saturated signal beam having approximately a constant phase shift and approximately a constant power level for a range of signal beam power levels.

8. The multi-stage fiber amplifier system of claim 7, wherein said signal beam is modulated and said saturated signal beam is at a low power level when said signal beam is at a low power level, and said saturated signal beam is at an approximately constant power level for all other power levels of said signal beam.

9. The multi-stage fiber amplifier system of claim 7, wherein said signal beam and said saturated signal beam have a wavelength of between approximately 940 nm and approximately 1600 nm, and where first wavelength and said second wavelength are each in a range between approximately 700 nm and approximately 1500 nm.

10. The multi-stage parallel fiber amplifier system of claim 7, wherein said fiberoptic fiber is selected from the group consisting of an Nd doped fiber, a Yb doped fiber, an Er doped fiber, an Er—Yb doped fiber, an LMA fiber having a physical core diameter between 10000 nm and 20000 nm, and an LMA fiber having a physical core diameter larger than 10000 nm.

11. A multi-stage parallel fiber amplifier system for producing a phase controlled, amplified signal beam, comprising:
   a plurality of fiber amplifier paths, each fiber amplifier path comprising:
      a pre-amplification fiber amplifier stage adapted to receive a signal beam and a pump input, and output a pre-amplified signal beam based at least in part upon said pump input;
      a saturated amplification fiber amplifier stage adapted to receive said pre-amplified signal beam and output a saturated signal beam having essentially a constant output level and a phase modulation characteristic that is essentially invariant with respect to the power level of the pre-amplified signal beam; and
      a power amplification fiber amplifier stage adapted to receive said saturated signal beam and output the amplified signal beam;
   a detector adapted to detect an amplitude of at least a portion of each said amplified signal beam of each said fiber amplifier path and output a phase indication of a relative phase of each said amplified signal beam; and
   a phase controller adapted to receive said phase indication and modulate each said pump input to change a phase of each said pre-amplified signal.

12. The multi-stage parallel fiber amplifier system of claim 11, further comprising:
   a laser adapted to output a single mode source beam; and
   a fiberoptic splitter adapted to receive said source beam and output said signal beam to each said pre-amplification fiber amplifier stage of each fiber amplifier path, said signal beam being a portion of said source beam.

13. The multi-stage parallel fiber amplifier system of claim 11, further comprising:
   a laser adapted to output a continuous wave single mode source beam;
   an electro-optical modulator adapted to receive said source beam, modulate an intensity of said source beam, and output a modulated beam;
   a second pre-amplifier adapted to receive said modulated beam, amplify said modulated beam, and output a regenerated modulated beam; and
   a fiberoptic splitter adapted to receive said regenerated modulated beam and output said signal beam to each said pre-amplification fiber amplifier stage of each fiber amplifier path, said signal beam being a portion of said source beam.

14. The multi-stage parallel fiber amplifier system of claim 13, wherein said signal beam is modulated and said saturated signal beam has a gain that suppresses amplified spontaneous emission of the power amplification fiber amplifier stage.

15. The multi-stage parallel fiber amplifier system of claim 13, further comprising:
   a second electro-optical modulator adapted to receive said modulated beam from said electro-optical modulator, modulate an intensity of said modulated beam, and output said modulated beam to said second pre-amplifier.

16. The multi-stage parallel fiber amplifier system of claim 11, wherein said power amplification stage each comprises a plurality of fiber amplifiers and further comprising:
   a collimator adapted to collimate the amplified signal beam from said plurality of fiber amplifiers of said power amplification stage.

17. The multi-stage parallel fiber amplifier system of claim 16, wherein said collimator is adapted to collimate the amplified signal beam in the far field, and wherein said detector is adapted to detect said amplified signal beam in the far field.

18. The multi-stage parallel fiber amplifier system of claim 11, further comprising:
   a beam splitter adapted to direct a portion of said amplified signal beam to said detector.

19. The multi-stage parallel fiber amplifier system of claim 11, wherein said saturated amplification stage further comprises a plurality of saturation amplifiers and wherein each of said plurality of saturation amplifiers further comprises:
   a fiber;
   a pump diode adapted to optically pump said fiber; and
   a wave division multiplexor adapted to receive said pre-amplified signal beam and couple said pre-amplified signal beam to said fiber, and
   wherein said fiber and the optical pumping by said pump diode are adapted to produce a saturated signal beam having output level that stays substantially constant when an amplitude of said pre-amplified signal beam varies, and having a phase that does not substantially vary when said amplitude of said pre-amplified signal beam varies.

20. The multi-stage parallel fiber amplifier system of claim 19, wherein said pre-amplified signal beam has a wavelength of between approximately 940 nm and approximately 1600 nm, and wherein said pump diode has a wavelength of between approximately 700 nm and approximately 1500 nm, and wherein said fiber is selected from the group consisting of an Nd doped fiber, a Yb doped fiber, an Er doped fiber, an Er—Yb doped fiber, an LMA fiber having a physical core diameter between 10000 nm and 20000 nm, and an LMA fiber having a physical core diameter larger than 10000 nm.

* * * * *